United States Patent [19]

Brimer et al.

[11] Patent Number: 4,784,212
[45] Date of Patent: Nov. 15, 1988

[54] BUILDING PERIMETER THERMAL ENERGY CONTROL SYSTEM

[75] Inventors: Benny Brimer, Anaheim; William A. Hays, Jr., Dana Point; Dieter L. Rall, Newport Beach, all of Calif.

[73] Assignee: Transmet Engineering, Inc., Anaheim, Calif.

[21] Appl. No.: 933,473

[22] Filed: Nov. 21, 1986

[51] Int. Cl.⁴ ............ F25B 29/00; G05D 23/00
[52] U.S. Cl. .................... 165/2; 165/11.1; 165/12; 165/29; 236/46 R; 236/46 F; 364/557; 364/578; 374/29; 374/103; 374/109
[58] Field of Search ............. 165/11.1, 12, 29, 2; 236/46 R, 46 F, 94; 374/29, 30, 103, 109; 364/505, 557, 575, 578; 340/588

[56] References Cited

U.S. PATENT DOCUMENTS

| | | | |
|---|---|---|---|
| 3,979,059 | 9/1976 | Davis et al. | 236/46 R |
| 4,071,745 | 1/1978 | Hall | 165/11.1 |
| 4,244,516 | 1/1981 | Christiansen | 236/46 R |
| 4,274,475 | 7/1981 | Rall et al. | 165/12 |
| 4,293,028 | 10/1981 | Knoll | 165/12 |
| 4,296,627 | 10/1981 | Lindström | 165/11.1 |
| 4,494,184 | 1/1985 | Crevel | 165/28 |
| 4,504,010 | 3/1985 | Sukimoto et al. | 236/46 F |
| 4,527,231 | 7/1985 | Aucel et al. | 364/557 |
| 4,542,283 | 9/1985 | Leverenz | 307/39 |
| 4,555,764 | 11/1985 | Kuehn | 374/29 |
| 4,694,890 | 9/1987 | Zarate | 165/29 |

FOREIGN PATENT DOCUMENTS

| | | | |
|---|---|---|---|
| 0019344 | 11/1980 | European Pat. Off. | 236/46 R |
| 0111410 | 6/1984 | European Pat. Off. | 236/46 R |
| 0182239 | 5/1986 | European Pat. Off. | 236/46 R |
| 2454613 | 11/1980 | France | 165/11.1 |
| 2483579 | 12/1981 | France | 165/11.1 |

Primary Examiner—Albert W. Davis, Jr.
Assistant Examiner—John K. Ford
Attorney, Agent, or Firm—Fulwider, Patton Rieber, Lee & Utecht

[57] ABSTRACT

A microprocessor-based perimeter thermal energy control system regulates heating and cooling in the perimeter area of a building in accordance with instantaneous and integrated heat flow measurements and instantaneous temperature deviation measurements. Control of heat pumps and air conditioning units is provided as is automatic switching between heating and cooling. The inherent thermal parameters of the space are inductively determined and used by the system to continually self-adapt to the heat flow properties of the space. The gain of the heat flow based control system is varied automatically as a function of the deviation between the actual space temperature and the desired set point temperature. Morning recovery is initiated and regulated in response to instantaneous and integrated heat flow measurements and inductively determined thermal space parameters and produces a near linear stepwise change in the temperature of the space from night setback to occupancy temperature.

14 Claims, 6 Drawing Sheets

BUILDING PERIMETER THERMAL ENERGY CONTROL SYSTEM

BACKGROUND OF THE INVENTION

This invention relates generally to a control system for regulating heating and cooling in the perimeter area of a building, and more particularly has reference to a control system that regulates according to the accumulated direction and magnitude of heat flow through the exterior building envelope and the instantaneous deviation of the interior temperature from a desired set point temperature.

The central air handling system of a building is normally regulated in accordance with temperature measurements taken in the core of the building. The resulting temperatures produced in the space are usually comfortable for persons located in the core, but are frequently uncomfortable for persons located near the perimeter of the building. This is because the effects of heat loss or heat gain through the exterior walls of the building are more noticeable to persons in the perimeter areas.

Accordingly, many buildings have been provided with perimeter control systems that attempt to bring the temperature of the building perimeter into closer correspondence with the temperature of the building core. Some of these systems use a heat pump positioned adjacent the exterior walls. Others use a constant temperature, variable air volume or variable temperature, constant volume air handling system mounted in a perimeter region of the ceiling. Those units are normally used in combination with a baseboard heater, a heating coil in the duct, or a fan which recirculates warm air from a ceiling plenum.

Many of the perimeter control systems operate in accordance with control signals provided by temperature sensors. Some use a single sensor located on an interior surface of an exterior wall. Other use a plurality of sensors, one being located to sense the air temperature at the building core, another being located to sense outside air temperature, another located to sense the temperature adjacent the perimeter control system, and others located to respond to the radiant heat of the sun.

Unfortunately, the thermal energy requirements in the perimeter area of the building are not merely a function of instantaneous temperatures, but also are affected by heat loss or heat gain through the exterior walls of the building. For example, a change in the relative position of the sun or a rapid change in wind velocity can have an immediate impact on the thermal energy requirements in a perimeter area adjacent a window even though there may be no immediate change in temperature in that area. Perimeter control systems regulated by air temperature sensors alone can be slow to react to these types of heat flow changes, resulting in inaccuracies and inefficiencies in the thermal management of the space.

This problem was addressed by the perimeter control system described in U.S. Pat. No. 4,274,475 which used a heat flow sensor mounted on a window or some other thermally conductive element of the building exposed to outside weather conditions. The sensor measured the instantaneous net heat flow through the building element to generate a signal which was proportional to the rate of net heat flow taking place at any given time. The signal controlled the system so that the heating or cooling was proportional to the instantaneous rate of heat loss or heat gain through the building element. Neither inside nor outside air temperature measurements were required.

The system regulated by instantaneous heat flow measurements was a significant advance over earlier systems which were regulated by temperature measurements, but it comprehended the use of a heater alone or a cooler alone. Moreover, it was used successfully only with conventional, i.e., non-compressor type, heating and cooling devices which did not have to be shut down for a certain length of time between cycles.

The heat flow properties of a space are determined by its overall physical characteristics such as window type, window size, wall area, and the like. A perimeter control system that introduces thermal energy into a space in response to signals produced by a heat flow sensor mounted on a selected building element must therefore be adapted to take account of those factors. During morning warm-up, information regarding the thermal capacity of the building was estimated or empirically developed in order to optimize the warm-up time. A manually selected gain factor was used to set up the required relationship of heat loss to make-up heat and match the system to the building characteristics. Any errors in the assessment or in the subsequent estimation of the gain could result in less than optimal thermal management of the space.

Once set, the gain of the system regulated by instantaneous heat flow measurements remained fixed throughout operation. The system thus introduced thermal energy into the space at a rate which was directly proportional to the measurement of instantaneous heat flow at any given time irrespective of the deviation between the actual temperature of the space and the desired set point temperature. If the delivered heat did not exactly match losses, as was the case where the building leaked air at the perimeter, the space temperature would drift up or down. A simple on/off temperature override was used to turn the perimeter heat full "on" or full "off" for a brief time to bring the system within the desired limits of space temperature.

It is conventional practice to shut off the central heating and cooling system at night when the space is unoccupied. A recovery routine is then initiated early in the morning to change the temperature of the space from the night setback level to the desired occupancy temperature in time for the return of the occupants. During the night setback period, the core air handling system is shut down and the perimeter system is used to hold the building at night setback temperature and to warm the space in preparation for occupancy. It is desirable to change the space temperature in a linear fashion over as short a period of time as possible to minimize energy consumption. However, during this period when the building is being brought to occupancy temperature, the heating and cooling system needs sufficient energy in reserve to respond to emergency conditions such as a sudden cold snap. The perimeter control system which was regulated by instantaneous heat flow measurements when operating in the normal occupancy mode responded to the deviation between the night setback temperature and the desired occupancy temperature when operating in the morning recovery mode to change the temperature of the space in a non-linear fashion.

A need thus exists for a heat flow regulated perimeter control system which has automatic switching between heating and cooling, including control of heat pumps and air conditioning units, which is self-adapting to the thermal properties of the space, and which has optimized performance in both the normal and morning recovery modes of operation.

SUMMARY OF THE INVENTION

The present invention satisfies the needs of the prior art by providing a microprocessor-based and user programmable perimeter thermal energy control system which is regulated in accordance with integrated heat flow measurements in a manner which provides effective control of heat pumps and air conditioner units, which establishes a learning capability whereby the system automatically self-adapts to the thermal characteristics of the space, and which optimizes the control function for improved performance in both the normal and morning recovery modes of operation.

The system of the present invention controls perimeter heating and cooling in real time based upon a measurement of the accumulated heat flow through the building envelope. A heat flow sensor measures the instantaneous heat loss or heat gain. The instantaneous measurements are fed into a microprocessor where they are summed over a period of time to arrive at a total net, or algebraic sum, of the heat loss or heat gain through the envelope. That integrated heat flow information is used by the microprocessor to accurately determine the amount of heating or cooling required for the desired thermal condition to be achieved for the space.

The system of the present invention can be used to effectively regulate compressor-type heating and cooling devices, such as heat pumps and air conditioner units, which must be shut down for a certain length of time between cycles. With the present invention, the heat flow measurements are continually collected, integrated and stored in memory during the shutdown time and are then recovered from memory at the conclusion of shutdown and used to regulate the system in a manner which takes account of the thermal conditions present during the shutdown period. No thermal information is lost or ignored as a consequence of the shutdown time.

The ability to regulate heat pumps provides the capacity for automatic switching between heating and cooling. The logic functions which implement automatic switching in heat pump based systems are also used, with appropriate modifications, to provide automatic switching between heating and cooling in systems with conventional heating and cooling devices such as electric or hot water heaters and chilled water cooling coils in the perimeter air handling system.

A microprocessor uses the integrated heat flow measurements to inductively determine and memorize the parameters which affect the overall thermal capacity of the space and the thermal capacity of the perimeter heaters and coolers. Physical measurements or assessments of zone conditions such as window area and building "U" factors are not required. The system automatically "learns" those conditions based upon its own past performance.

The microprocessor uses the learned parameters to continually self-adapt the system to the heat flow properties of the envelope surrounding the space. The thermal output power produced by the heaters and coolers in response to the heat flow measurements is automatically varied in accordance with the determined space parameters to account for the inherent heat flow properties of the space and the inherent thermal capacity of the heaters and coolers. This results in energy savings and effective thermal management.

The system of the present invention conserves energy and optimizes temperature control by using the integrated heat flow measurement in combination with the determined space flow parameters and instantaneous interior temperature measurements to regulate the heating and cooling in the perimeter area of the building. The temperature measurements are provided by a temperature sensor located in the space.

Use of the integrated heat flow measurement as a factor for control of perimeter heating and cooling optimizes the control function because it allows the system to compensate for variations in the rate of heat flow through the building envelope before those variations can produce any appreciable change in the temperature of the space. In other words, the systems need not wait for a rise or fall in the temperature of the space before demanding heating or cooling, but rather produces heating or cooling in response to changes in the actual heat loss or heat gain through the building envelope. The temperature of the space is thus effectively maintained at the desired level.

The microprocessor automatically varies the sensitivity or gain of the heat flow based control system as a function of the deviation between the desired set point temperature and the actual space temperature as measured by the temperature sensor. The gain of the heat flow based control system is increased as the space temperature moves away from the set point and is decreased as it moves toward the set point, thereby introducing greater or lesser amounts of thermal energy into the space in response to a given heat flow measurement. This automatic compensation and self-correcting feature results in improved temperature control performance and more accurate temperature maintenance. It also produces significant energy savings by automatically reducing the power consumption as the space temperature nears the desired set point.

The integrated heat flow measurement and the determined space parameters are used by the microprocessor in combination with a temperature deviation measurement to automatically determine when to initiate the morning recovery mode of operation and are used to automatically regulate the power supplied to the heating and cooling devices while in that mode of operation. The temperature deviation used in the determination of whether to initiate recovery is the deviation between the desired occupancy temperature and the actual space temperature as measured by the temperature sensor. The temperature deviation used to regulate the heating or cooling during recovery is the deviation between the measured space temperature and a variable set point which is automatically changed in a sequence of incremental steps between the space temperature at initiation of the recovery cycle and the desired occupancy temperature. This causes the actual space temperature to be changed to the occupancy temperature in a stepwise fashion which closely approximates the linear change needed for efficient and optimal operation.

An object of the invention is, therefore, to provide an improved perimeter thermal energy control system.

Another object of the invention is to provide a heat flow regulated perimeter thermal energy control system which has automatic switching between heating and cooling.

Yet another object of the present invention is to provide a heat flow regulated perimeter thermal energy control system which is capable of successfully regulating heat pumps and air conditioner units.

Still another object of the invention is to provide a perimeter thermal energy control system which is self-adapting to the thermal properties of the space.

A further object of the invention is to provide a perimeter thermal energy control system which has optimized control performance in both the normal and morning recovery modes of operation.

A still further object of the invention is to provide a perimeter thermal energy control system which is microprocessor-based and user programmable.

Yet another object of the invention is to provide a perimeter thermal energy control system which inductively determines the heat flow parameters of the space and the thermal capacity of the heaters and coolers.

Still another object of the invention is to provide a perimeter thermal energy control system in which integrated heat flow measurements are used as a factor for control of perimeter heating and cooling.

Another object of the invention is to provide a heat flow regulated perimeter thermal energy control system which has a gain that varies automatically as a function of temperature deviation.

Yet another object of the invention is to provide a perimeter thermal energy control system in which the space temperature is changed in a near linear manner during a morning recovery operation.

Another object of the invention is to provide a perimeter thermal energy control system which conserves energy.

Other features and advantages of the invention will become apparent from the following detailed description, taken in conjunction with the accompanying drawings, which illustrate, by way of example, the features of the invention.

DETAILED DESCRIPTION OF THE PREFERRED EMBODIMENTS

Figure 1:
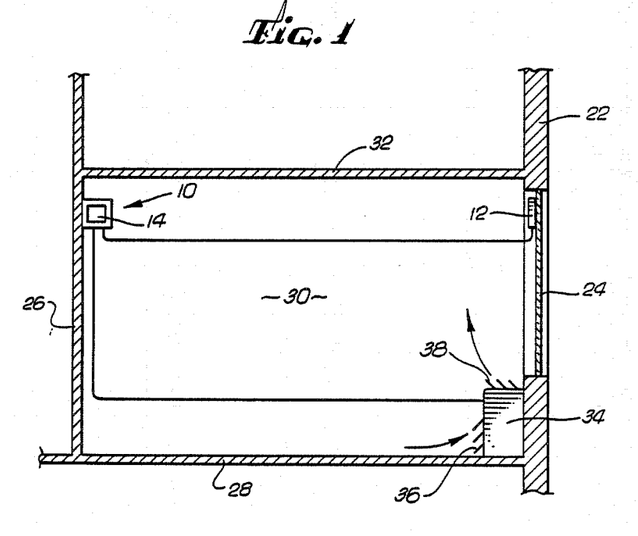
FIG. 1 is a diagrammatic view illustrating a control unit incorporating features of the present invention used to regulate a heat pump based perimeter heating and cooling system.
Figure 2:
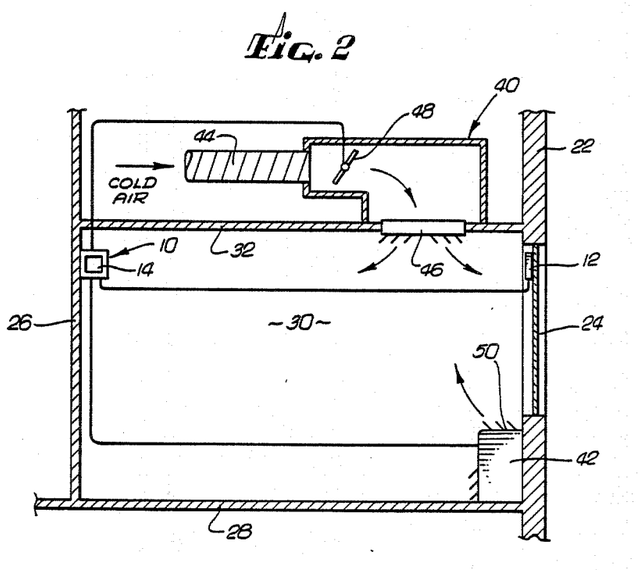
FIG. 2 is a diagrammatic view illustrating the control unit of FIG. 1 used to regulate a VAV unit and baseboard heater.
Figure 3:
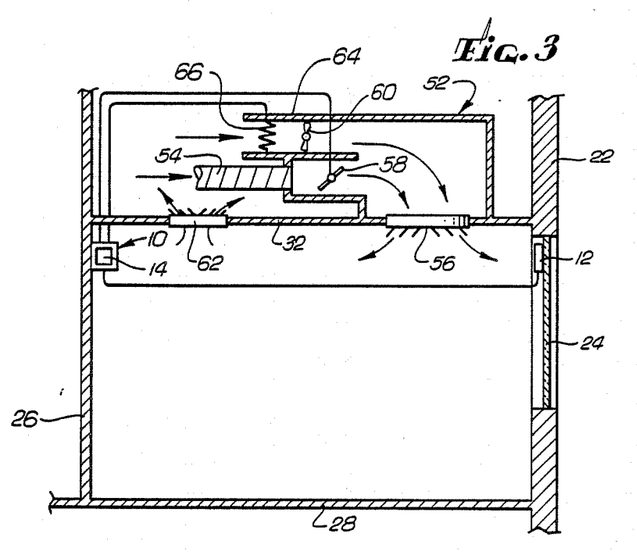
FIG. 3 is a diagrammatic view illustrating the control unit of FIG. 1 used to regulate a fan-powered unit with reheat.

As shown in the drawings for purposes of illustration, and with particular reference to FIGS. 1-3, the invention is embodied in a control unit 10 which receives signals from a heat flow sensor 12 and a temperature sensor 14 and is adapted to regulate various types of building perimeter heating and cooling systems.

A room in the perimeter area of a building typically includes an exterior wall 22 and window 24 exposed to the environment, and an interior wall 26 opposite the exterior wall 22, a floor 28, a pair of side walls 30, only one of which is illustrated, and a ceiling 32. In the preferred embodiment, the control unit 10 is mounted on the interior wall 26 and includes an internal temperature sensor 14, such as a resistive or any other conventional solid state or thermoelectric temperature sensing device adapted to measure the instantaneous temperature of the air in the room. An external, remote temperature sensor (not shown) can be substituted for the internal sensor 14 when it is desired to locate the control unit 10 outside the perimeter space. The heat flow sensor 12 is typically bonded to the inner surface of the window 24 and is adapted to measure the rate of heat flow in BTU/sq.ft./Hr. through the building envelope. The heat flow sensor 12 can be any conventional device, such as a thermopile or the device described in U.S. Pat. No. 3,542,123, which is capable of producing an electric output signal that is proportional to the net direction and magnitude of heat flow through the device 12.

The control unit 10 is capable of producing a variety of different output signals so that it can be interfaced with a variety of different types of perimeter heating and cooling systems and devices, as is shown generally in FIGS. 1-3.

Referring to FIG. 1, the control unit is used to regulate the operation of a perimeter heating and cooling system which includes a heat pump 34 mounted on the floor 28 (or alternatively on the ceiling 32) of the room along the exterior wall 22. The heat pump 34 draws room air through an intake vent 36 adjacent the floor 28 (or ceiling 32), heats or cools the air in accordance with the operational state of an internal multi-speed compressor (not shown) and reversing valve (not shown) and an internal auxiliary heating coil (not shown) of the electric resistive filament or hot water type, and then uses an internal fan (not shown) to expel the heated or cooled air through an exhaust vent 38 in the top (or bottom) of the unit 34, all in a manner well known in the art.

Referring to FIG. 2, the control unit 10 is used to regulate the operation of a perimeter heating and cooling system which includes a conventional VAV cooling unit 40 mounted in the ceiling 32 of the room and a conventional baseboard heater 42 mounted o the floor 28 along the exterior wall 22. The VAV cooling unit 40 receives constant temperature cold air through a duct 44 connected to the central air handling system (not shown) and exhausts a variable volume of that air through a ceiling vent 46 to control the temperature of the air in the room. The volume of cold air expelled through the vent 46 is regulated by a damper 48 which is selectively opened and closed by an electric or pneumatic motor (not shown). A conventional electric resistive filament or hot water heating coil (not shown)

located in the baseboard heater 42 radiates heat through a vent 50 to provide auxiliary perimeter heat to the space.

Referring now to FIG. 3, the control unit 10 is used to regulate the operation of a perimeter heating and cooling system which includes a conventional fan powered unit with reheat 52 mounted in the ceiling 32 of the room. Like the unit shown in FIG. 2, the fan powered unit receives constant temperature cold air through a duct 54 connected to the central air handling system (not shown) and exhausts a variable volume of that air through a ceiling vent 56 to control the temperature of the air in the room. The volume of cold air expelled though the vent 56 is regulated by a damper 58 which s selectively opened and closed by an electric or pneumatic motor (not shown). Heating is provided by a fan 60 which draws warm room air through a return vent 62 and into a plenum above the ceiling 32. The fan 60 then forces the warm air through a plenum duct 64 where it is exhausted back into the space through the ceiling vent 56. The fan 60 is activated by an external switch (not shown) or by an end switch (not shown) which is automatically thrown into the "on" position when the damper 58 closes. A conventional electric resistive filament or hot water heating coil 66 located in the plenum duct 64 upstream of the fan 60 is selectively activated to heat the plenum air and provide auxiliary heating when needed.

In all of the systems discussed above with reference to FIGS. 1-3, the control unit 10 operates the various fans, compressors, reversing valves, damper motors and heating coils in accordance with the instantaneous temperature of the space as sensed by the temperature sensor 14 and the measured heat flow through the envelope surrounding the space as sensed by the heat flow sensor 12. Details of the output signals produced by the control unit 10 and exemplary interface devices for interfacing those signals with the various heating and cooling devices described above will be discussed later with reference to FIG. 4 and more particularly with reference to FIGS. 5-9.

Figure 4:
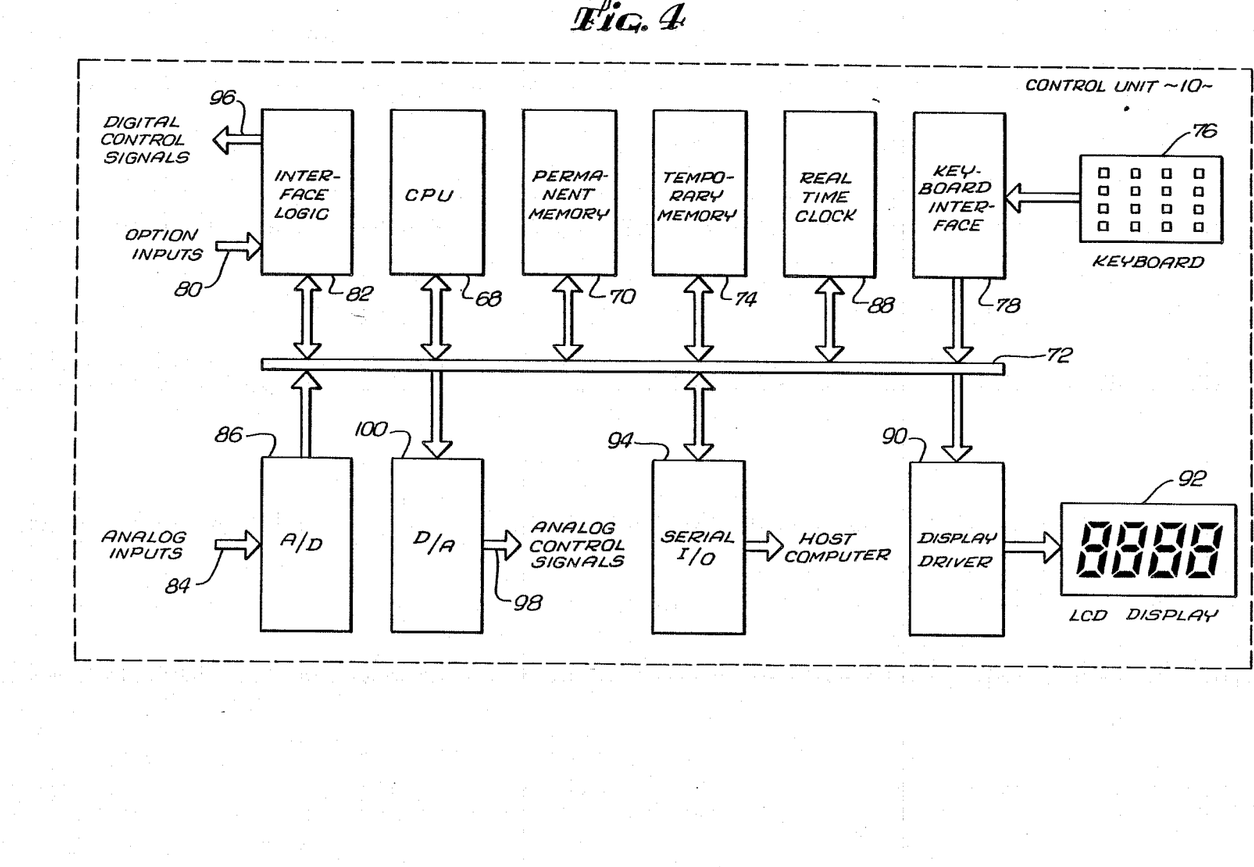
FIG. 4 is a block diagram of the control unit shown in FIGS. 1-3.

In accordance with the present invention, and with particular reference to FIG. 4, the control unit 10 is a user programmable data processor which provides effective control over the various systems described above. It has automatic switching between heating and cooling, self-adaptation to the thermal characteristics of the space, and optimized performance in both the normal and morning recovery modes of operation.

A microprocessor or CPU 68 of the general purpose type, such as the Hewlett-Packard 2000, is in two-way communication with a permanent memory 70, such as an EPROM device, via a data communication bus 72. The memory 70 contains instructions which control the operation of the processor 68 in accordance with features of the present invention. Those instructions will be described later with reference to FIG. 10.

The processor 68 is also in two-way communication with a temporary memory 74, such as a RAM device, which stores various user selectable inputs such as system mode (e.g., heat only; cool only; automatic heat/cool; system off; and fan on/automatic), set points (e.o., occupied and unoccupied times and days; desired heat and cool occupancy temperatures; desired heat and cool unoccupied temperatures; temporary override heat, cool and time for special circumstances; and skip days for maintenance of unoccupied temperature during vacations and holidays), and display format (e.g., alternate time and temperature display; status and mode indications; and program prompting). The user selectable inputs are entered into the memory 74 by use of a keyboard 76 which is in one-way communication with a keyboard interface 78. The interface 78 has one-way communication with the memory 74 via the data bus 72. It is usually convenient to incorporate the keyboard 76 into the face of the control unit 10.

Various option inputs 80 are entered into the system through interface logic 82 which is in two-way communication with the processor 68 via the data bus 72. Typical option inputs include selection between heat pump operation and conventional operation and selection of the output control signals which are appropriate for the type of perimeter heating and cooling system being used. In the preferred embodiment, selection of the option inputs 80 is accomplished by inserting or removing jumpers (not shown) associated with a series of processor input ports (not shown). However, it is appreciated that the selection can be made in any other convenient manner.

The analog inputs 84, which include the signals from the temperature sensor 14 and the heat flow sensor 12, are converted into serial data streams by an analog-to-digital converter 86 which is in one-way communication with the processor 68 via the data bus 72. The time-of-day is continually updated and input into the system by a real-time clock 88 which is provided as a part of the control unit 10 and is in two-way communication with the processor 68 via the data bus 72.

A display driver 90 in one-way communication with the processor 68 via the data bus 72 operates a liquid crystal display 92. The display 92 presents status information, such as user selected system mode and set points, current space temperature and heat flow measurements, and system power consumption, in the format selected by the keyboard inputs discussed above.

A serial I/O 94, such as an RS232, in two-way communication with the processor 68 via the data bus 72, is provided to enable the control unit 10 to communicate with or be controlled by the host computer (not shown) which operates the main building automation system (not shown).

The control unit 10 produces two types of output control signals. Digital control signals 96 are produced by the interface logic 82 and analog control signals 98 are produced by a digital-to-analog converter 100 which is in one-way communication with the processor 68 via the data bus 72. By entering the appropriate option inputs 80 which were described above and by using the appropriate output interface devices which will be described below with reference to FIGS. 6-9, the control unit 10 can be used to regulate the operation of various different types of perimeter heating and cooling systems, particularly the types of systems discussed above with reference to FIGS. 1-3.

The digital control signals 96 typically include relay control signals, which are used for control of heat pumps and electric damper motors, and pulse control signals, which are used for control of electric resistive filament heating coils. The analog control signals 98 typically are used to produce modulating 4-20 ma analog output signals which are used for control of current-to-pressure (I/P) transducers that regulate hot water heating coils and pneumatic damper motors and modulating 6-9 VDC analog output signals which are used for control of electric flow valves that regulate hot water heating coils and SCR power modules that regulate resistive filament heating coils. The analog output signals are modulated linearly in proportion to the power required for the associated heating coils or damper motors. While the above outputs are preferred because they are compatible with the heating and cooling devices common to most in perimeter systems, it will be appreciated that different outputs can be provided if necessary or desirable to interface the control unit 10 with other types of systems.

Figure 5:
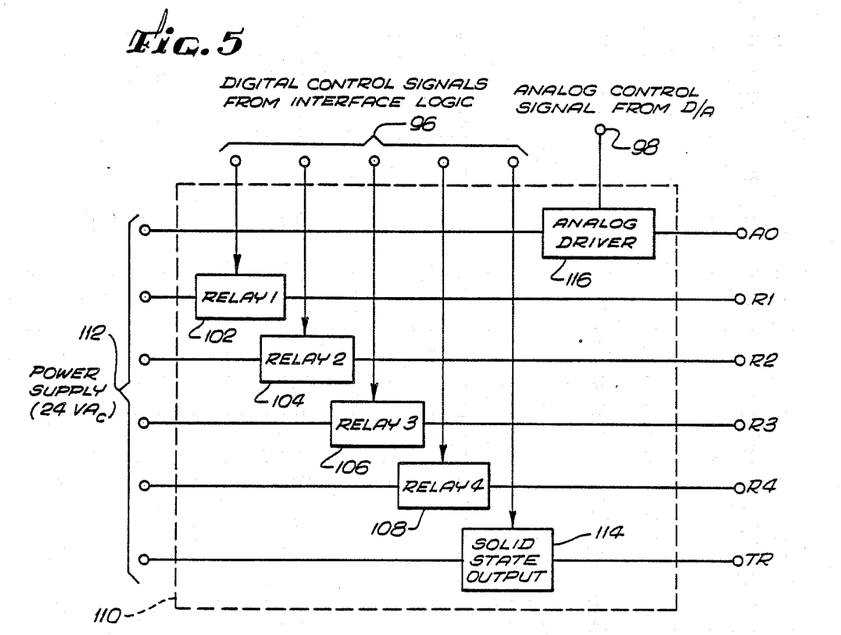
FIG. 5 is a block diagram of the output end of the control unit shown in FIG. 4.
Figure 6:
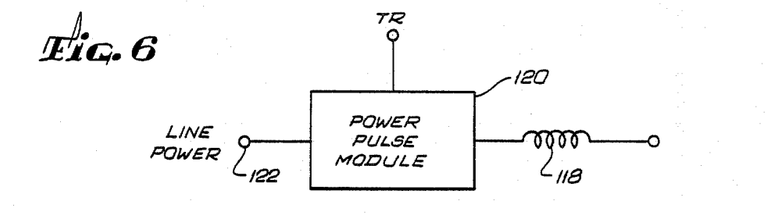
FIGS. 6-9 are block diagrams of various interface apparatus used to interface the output end of the control unit shown in FIG. 5 with heating coils and pneumatic damper motors.
Figure 7:
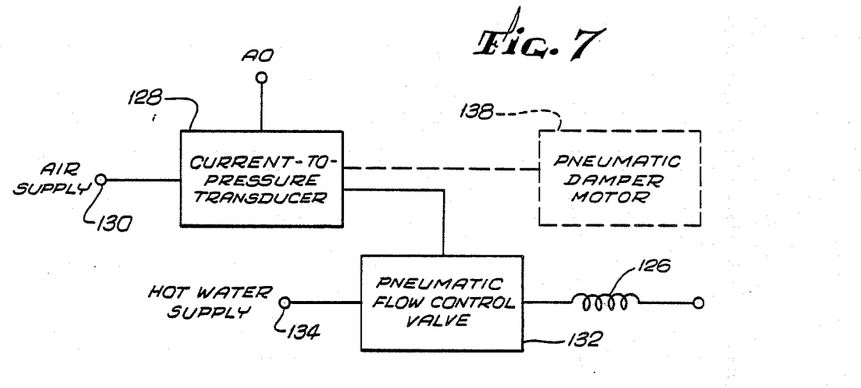
Figure 8:
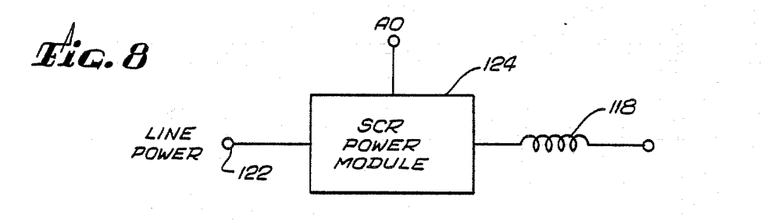
Figure 9:
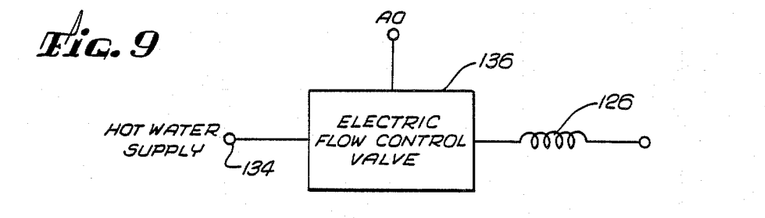

More particularly, and with reference to FIG. 5, the digital control signals 96 (relay control signals) are applied to control the opening and closing of a bank of four relays 102, 104, 106 and 108 which form a part of the output end 110 of the control unit 10. Upon closure, each of the relays communicates power, preferably 24 VAC, from a power supply 112 to respective control unit output terminals R1, R2, R3 and R4. The digital control signals 96 (pulse control signals) are applied to control the activation of a solid state output circuit 114, which may include a triac or similar device, that also forms a part of the output end 110 of the control unit 10. Upon activation, the solid state output circuit 114 receives power from the power supply 112 and produces a pulsing 24 VAC output signal at a control unit output terminal TR.

The analog control signals 98 are applied to control an analog driver 116 which also forms a part of the output end 110 of the control unit 10. Depending upon the option inputs 80 selected by use of the jumpers, the driver 116 will produce either a linear modulating 4-20 ma or a linear modulating 6-9 VDC analog output signal at the analog output terminal AO of the control unit 10.

The relay output terminals R1, R2, R3 and R4 of the control unit 10 are connected directly to control devices (not shown) within the various different types of perimeter heating and cooling systems. When the control unit 10 is used to regulate a heat pump based perimeter heating and cooling system of the type shown in FIG. 1, one of the terminals R1 is connected to operate the heat pump fan, other terminals R2 and R3 are connected to operate compressor low-speed and compressor high-speed respectively, and the other terminal R4 is connected to operate the reversing valve. When the control unit 10 is used to regulate conventional perimeter heating and cooling systems of the types shown in FIGS. 2 and 3 where an electric damper motor is used, one of the terminals R1 is connected to operate the local fan (not shown), other terminals R2 and R3 are connected to operate the motor for damper "open" and damper "close" respectively, and the other terminal R4 is connected to operate the plenum fan 60.

Referring now to FIGS. 6-9, various interface devices are used to interface the pulse output terminal TR and analog output terminal AO of the control unit 10 with the different types of perimeter heating and cooling systems.

There are two alternative schemes for interfacing the control unit 10 with any of the various electric resistive filament heating coils 118 used in perimeter heating and cooling systems. In one scheme (FIG. 6), the pulse output terminal TR is connected to a power pulse module 120 which preferably includes a mercury displacement relay (not shown). The module 120 converts line power 122 into a time-proportioned power pulse signal which is used to energize the heating coil 118. The pulse width, and consequently the amount of power applied to the heating coil 118, is determined by the output signal present at the pulse output terminal TR. In the alternative scheme (FIG. 8), the analog output terminal AO is connected to an SCR power module 124 which preferably includes a silicon controlled rectifier (not shown). The module 124 converts line power 122 into a time-proportioned power pulse signal which is used to energize the heating coil 118. The modulated 6-9 VDC analog output signal applied to the module 124 triggers the rectifier in a manner which controls the pulse width of the power pulse signal and thus regulates the amount of power applied to the heating coil 118.

There are also two alternative schemes for interfacing the control unit 10 with any of the various hot water heating coils 126 used in the perimeter heating and cooling systems. In one scheme (FIG. 7), the analog output terminal AO is connected to a current-to-pressure transducer 128 which controls air pressure communicated from a pressurized air supply 130 to a pneumatic flow control valve 132. The valve 132 responds to the air pressure to regulate the flow of hot water from a hot water supply 134 to the heating coil 126. The modulated 4-20 ma analog output signal present at the analog output terminal AO regulates the amount of air pressure which passes through the transducer 128 and thus regulates the amount of heat produced by the heating coil 126. In the alternative scheme (FIG. 9), the analog output terminal AO is connected to an electric flow control valve 136 which controls the flow of hot water from the hot water supply 134 to the heating coil 126. The modulated 6-9 VDC analog output signal present at the analog terminal AO regulates the flow of hot water through the valve 136 and thus regulates the amount of heat produced by the heating coil 126.

Referring again to FIG. 7, selection of the appropriate option inputs 80 by use of the jumpers enables the current-to-pressure transducer 128 to enter an alternative mode of operation in which it controls the air pressure communicated from the supply 130 to a pneumatic damper motor 138. The modulated 4-20 ma analog output signal present at the analog terminal AO regulates the amount of air pressure which passes through the transducer 128 and thus regulates the operation of the damper motor 138.

The overall operation of the control unit 10 can now be understood. During operation, the microprocessor 68 executes the instructions stored in the permanent memory 70 using as input data the various user selectable inputs, such as the set point times and temperatures, which are entered through the keyboard 76, the analog inputs 84 which represent the heat flow and temperature measurements obtained from the respective sensors 12 and 14, and the option inputs 80 which are entered by the jumpers to appropriately interface the control unit 10 with the intended type of perimeter heating and cooling system. The instructions can be embodied in various forms, but preferably they are provided in the form of conventional software codes which are pre-programmed into the memory 70 prior to use of the control unit 10. Execution of the instructions results in proper regulation of the perimeter heating and cooling system.

Figure 10:
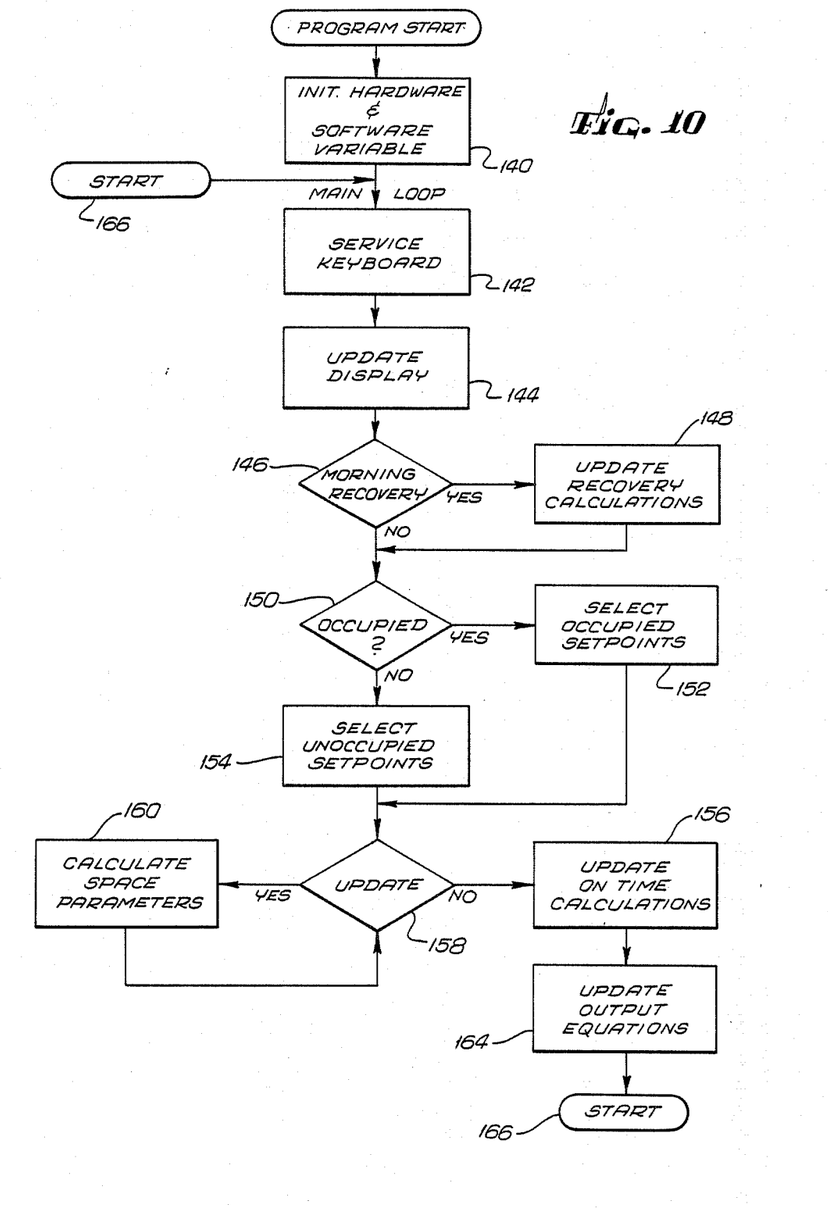
FIG. 10 is a flow chart illustrating the operation of the control unit shown in FIG. 4.

Referring to FIG. 10, the instructions stored in the memory 70 are shown in flow chart form.

The instructions commence with an initializing operation 140 in which the processor 68 reads the option inputs 80 and initializes the hardware and software variables. The user selectable inputs entered through the keyboard 76 are then read into the processor 68 in a keyboard service operation 142 and the information sent to the display river 90 is updated by an display update operation 144.

A decision 146 is then made whether to initiate the morning recovery mode of operation. This decision 146 commences as soon as the night setback begins and is based upon the results of the following interrogation equation:

$$t_{n5} = G\left[(T_o - T_s) - (A/C)\int_{t_4}^{t_5} Q\,dt\right]/(H/C)$$

where
G is a safety factor (typically G=1.5)
$T_o$ is the set point occupancy temperature;
$T_s$ is the instantaneous space temperature as measured by the temperature sensor 14;
Q is instantaneous heat flow through the envelope as measured by the heat flow sensor 12;
A/C is the space flow constant defined below in connection with the learning equations; and
H/C is the energy input constant defined below in connection with the learning equations.

The interrogation equation computes a value ($t_{n5}$) which reflects the time required to change the temperature of the space from its current level to the occupancy set point, taking account the inherent thermal capacity of the perimeter heating and cooling system and the inherent thermal properties of the space. The computation is based on a combination of the instantaneous temperature deviation and an integrated heat flow measurement taken over a period of time.

An affirmative decision to enter into the morning recovery mode is made when the following condition is satisfied:

$$t_{n5} > O_t - C_t$$

where
$O_t$ is set point time when occupancy begins; and
$C_t$ is the current time.

In other words, the time ($t_{n5}$) needed for the system to change the temperature of the space to the occupancy set point temperature is continuously computed and compared against the actual time remaining until occupancy and, when the computed time ($t_{n5}$) is found to exceed the time remaining, the system is commanded to enter into the morning recovery mode of operation.

The safety factor G causes the interrogation equation to compute a time ($t_{n5}$) which is greater than the actual time needed to raise the temperature of the space to the occupancy set point. Morning recovery will thus commence earlier than theoretically necessary and the thermal energy needed for recovery will thus be spread out over a longer period of time. As a result, the instantaneous energy demands on the system will be reduced (e.g., a 50% reduction in this particular instance) throughout the recovery period and the system will be able to keep energy in reserve for responding to emergency conditions, such as a sudden cold snap, which may occur during the recovery period.

Figure 12:
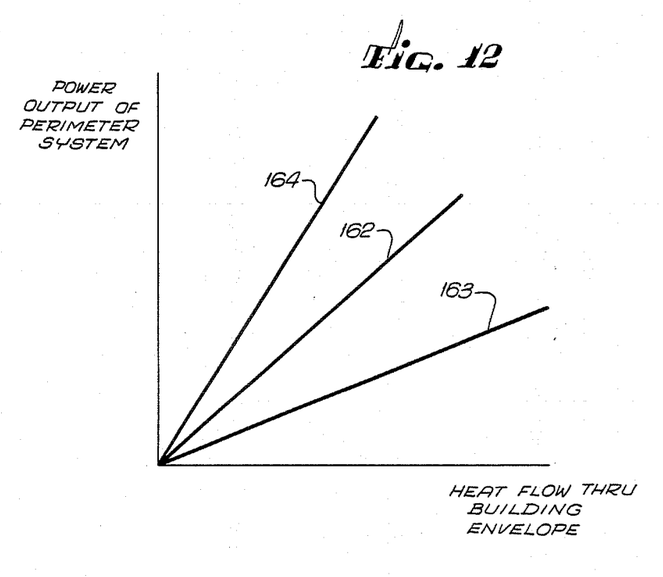
FIG. 12 is a graphical representation of a set of power demand curves for a thermal energy control system embodying features of the present invention, the curves of differing slope representing differing gains of the control system.

When an affirmative morning recovery decision is obtained, the recovery cycle is commenced in accordance with the following recovery "on" time equation:

$$t_{n6} = G\left[(T_v - T_s) - (A/C)\int_{t_4}^{t} Q\,dt\right]/(H/C)$$

where
G is a variable gain value which will be discussed below in connection with the learning equations; and
$T_v$ is a variable set point temperature which will be defined below with reference to FIG. 12.

The recovery "on" time equation computes a time ($t_{n6}$) which is used to command the heating and cooling system, operating in accordance with the primary control operations set out below, to remain "on" for the length of time needed to change the temperature of the space to the occupancy set point. The calculation undergoes a continual updating process 148 in which the instantaneous thermal conditions of the space are continually compared against the conditions needed to achieve the desired recovery goals.

Absent compensation, the primary control operations would tend to introduce excessive amounts of thermal energy into the space and change the temperature of the space more quickly than necessary during the morning recovery cycle. Compensation is provided by forcing the system to chase a series of variable set points which move slowly towards the occupancy temperature, rather than having it reach for the occupancy temperature all at once.

The variable set point $T_V$ used in the recovery "on" time equation is a stepping set point which is automatically changed in a sequence of incremental steps between the space temperature at initiation of the recovery cycle and the set point occupancy temperature. The variable set point $T_V$ is set equal to the instantaneous space temperature $T_s$ at initiation of the recovery cycle and is then changed every ten seconds in with accordance with following equation:

$$T_{vnew} = T_{vprevious} + [10(T_o - T_{sr})/(R_s - O_t)]$$

where
$R_s$ is the recovery start time in seconds;
$T_o$ is the set point occupancy temperature;
$O_t$ is the set point occupancy time in seconds; and
$T_{sr}$ is the space temperature at recovery start time as measured by the temperature sensor 14.

The "$10/(R_s - O_t)$" factor dictates the number of steps taken by the variable set point $T_v$ and thus determines the percentage of the total desired temperature change that must be made in each step.

Figure 11:
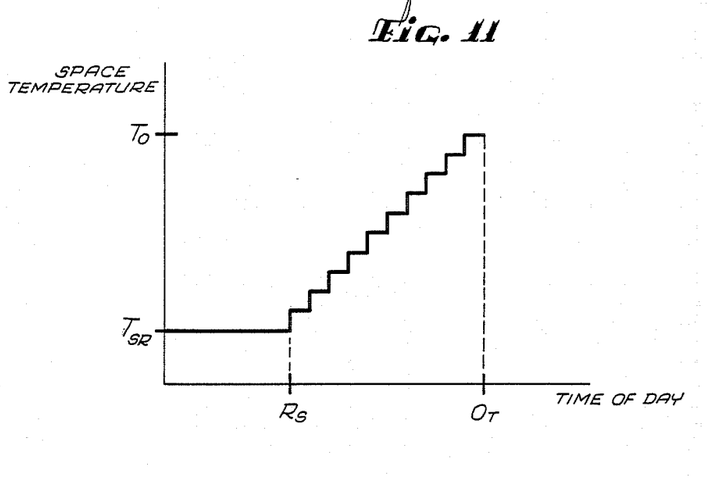
FIG. 11 is a graphical representation of the stepwise temperature change achieved during a morning recovery operation conducted in accordance with the present invention.

As shown in FIG. 11, the recovery "on" time equation using the variable set point $T_v$ causes the system to change the temperature of the space in a stepwise fashion which closely approximates an optimal linear change between the space temperature $T_{sr}$ at the recovery start time $R_s$ and the set point occupancy temperature $T_o$ at the set point occupancy time $O_t$.

The system exits the recovery cycle and returns to the normal mode of operation when the following condition occurs:

$$t_{n5} \leq (O_t - C_t) - 0.5(\text{hours})$$

where
$O_t$ is the set point occupancy time; and $C_t$ is the current time; until such time that the following condition reoccurs:

$$t_{n5} \geq O_t - C_t$$

where $O_t$ and $C_t$ are as defined in the preceeding equation.

In other words, recovery is initiated and terminated as a function of whether the computed time ($t_{n5}$) needed for the system to change the temperature of the space to the occupancy set point exceeds the actual time remaining until occupancy. The "0.5 (hours)" factor establishes a dead band which prevents the system from accidentally initiating morning recovery when an abnormal daytime weather condition, such as a quick cold snap, causes the computed time ($t_{n5}$) to momentarily satisfy the usual conditions for initiation of recovery.

Following exit from recovery, or following a negative answer to the recovery interrogation 146, the system performs an occupancy interrogation 150 to decide whether to operate in the "occupied" mode, which is appropriate when the space is occupied, or in the "unoccupied" mode, which is appropriate when the space is expected to be vacant (e.g., at night). The current time of day as indicated by the real-time clock 88 is compared against the occupied and unoccupied set point times which were previously selected by the user via the keyboard 76. If the actual time falls within the occupancy set point times, a selection function 152 is initiated to retrieve the occupancy set point temperatures stored in the temporary memory 74. If the actual time falls within the unoccupied set point times, a different selection function 154 is initiated to retrieve the unoccupied set point temperatures stored in the memory 74. The retrieved set point temperatures are then used as input data for commencing or continuing the operation of the perimeter heating and cooling system in accordance with the primary control operations.

In all of the modes of operation, the control unit 10 regulates the performance of the perimeter heating and cooling in a manner which automatically takes account of the inherent thermal properties of the entire space and the inherent thermal capacity of the heaters and coolers used in the system. This is accomplished by using the heat flow measurements taken from the sensor 12 to inductively determine or "learn" the thermal parameters of the system and the space and to then to use those learned parameters to continually self-adapt the system to the space.

The pertinent thermal parameters are developed in the form of numerical constants which are stored in the memory 74 and used in a subsequent "on" time control operation 156 which regulates the performance of the perimeter heating and cooling system. To track changing conditions, the constants are updated periodically (e.g., daily) at selected times during the temperature cycle by the use of an update operation 158. However, to avoid making changes in response to merely intermittent conditions, a moving average (e.g., a weekly moving average) is calculated and used. A moving average is a well-known mathematical operation which does not change the previously determined value to the newly determined value but merely moves it a small amount in that direction.

The update function 158 interrogates the current time, temperature and mode of operation to decide whether the update conditions are present. If the interrogation produces an affirmative response, the constants are re-calculated and updated in a learning operation 160. If the interrogation produces a negative response, or if the update cycle is complete, the constants are supplied for use in the "on" time control operation 156.

The following parameters have a significant impact on the thermal characteristics of a space:

C—Thermal capacity of the space in BTU/°F.;
Q—Heat flow density (BTU/Hr-Ft$^2$) through the exterior window 24 as measured by the heat flow sensor 12. (The valve is usually negative for heat loss and positive for heat gain);
A—window area (ft$^2$) of the entire envelope surrounding the space; and
H—Heating or cooling source power rating for the space (BTU/Hr)

The space flow constant (A/C), which is a measure of the relationship between the inherent heat loss or heat gain through the envelope surrounding the space and the resulting change in the temperature of the space, i.e., the inherent capacity of the space to hold heat, is determined during the learning cycle 160 by use of the following equation:

$$A/C = (T_2 - T_1) / \int_{t_1}^{t_2} Q\, dt$$

where $T_1$ and $T_2$ are the space temperatures as
measured by the temperature sensor 14 at a first
time $t_1$ and second time $t_2$ respectively. It will be appreciated that the space flow constant is determined inductively on the basis of the instantaneous temperature signals produced by the temperature sensor 14 and an integration of the heat flow signals produced by the hear flow sensor 12, and that no manual measurement or examination of the windows or building "U" factors is required or needed.

The determination of the space flow constant is normally made at a time when the temperature of the space is dropping and no thermal energy is being introduced into the space by the perimeter heating and cooling system. Ideally, this occurs during the night setback cycle when the temperature of the space is changing from the occupancy set point to the night setback level. To ensure accuracy, the determination is started sometime (e.g., one hour) after the transition to the setback cycle has occurred and is made over a substantial period of time (e.g., one hour).

The energy input constant (H/C), which is a measure of the relationship between the thermal energy introduced into the space by the perimeter heating and cooling system and the resulting change in the temperature of the space, i.e., how much energy is needed to change the temperature of the space, is also determined during the learning cycle 160 by use of the following equation:

$$H/C = \left[ (T_4 - T_3) - (A/C) \int_{t_4}^{t_3} Q\, dt \right] / t_{n3}$$

where $T_4$ and $T_3$ are the space temperatures as measured by the temperature sensor 14 at a first time $t_3$ and a second time $t_4$;

$t_{n3}$ is the total time that power was applied to the perimeter heating and cooling system between the first and second times $t_3$ and $t_4$; and A/C is the space flow constant determined above.

As was the case with the space flow constant, the energy input constant is determined inductively on the basis of the signals produced by the temperature sensor 14 and heat flow sensor 12 without the need for manual measurement or examination of the space.

The determination of the energy input constant is normally made during a heating period such as the morning recovery cycle when the temperature of the space is changing from the night setback level to the desired occupancy temperature and the perimeter heating and cooling system is introducing substantial amounts of thermal energy into the space over a substantial period of time. For accuracy, the determination is made over a substanial period of time (e.g., one hour) during which the perimeter heating and cooling system is in the "on" condition. Also, a different determination of the energy input constant is made and stored for each stage (e.g., high and low) of the heating and cooling and for each stage of heat pump operation.

The primary control operations carried out by the control unit 10 for regulating the operation of the perimeter heating and cooling system, and the fundamental principals of operation which they implement, can now be understood.

The system has a heat flow working band which extends a certain amount (e.g., three degrees) above and below the set point temperature. When the space temperature lies outside the band limits, the perimeter heating and cooling system is controlled in accordance with the temperature deviations as measured by the temperature sensor 14. The system is commanded to apply full power regardless of the heat flow reading obtained from the heat flow sensor 12. When the space temperature falls within the band limits, the control unit 10 continually determines the thermal balance of the space based upon the space flow constants and energy input constants discussed above and the heat flow measurements obtained from the heat flow sensor 12 and then determines, at a given sampling rate (e.g., 10 seconds), the "on" time ($t_{n4}$) required for the system to make up for any thermal imbalance and achieve the desired set point temperature. The system is commanded to apply power for that "on" time.

To the extent that the "on" time signal is used to trigger the pulse output signals TR and the analog output signals AO, it controls the amount of power supplied to the heating coils 118 and 126 and damper motors 138 which were discussed with reference to FIGS. 6-9. The "on" time signal is a modulation signal that varies the amount of thermal energy output power produced by the heating coils 118 and 126 and damper motor 138 as a function of the measured thermal imbalance in the space.

The "on" time determination, which is carried out in the "on" time control operation 156, takes into account the current space flow constants and energy input constants supplied by the update operation 158 and thus causes the system to continually self-adapt itself to the inherent thermal properties of the space and the inherent thermal capacity of the heaters and coolers. The "on" time determination also continuously updates itself by taking into account the heat flow measured by the heat flow sensor 12 during the "on" time. The "on" time determination is made on the basis of the following equation which we have designated "MODULATION" for ease of reference:

$$t_{n4} = G\left[(T_{sp} - T) - (A/C)\int_{t_3}^{t_4} Q\, dt\right]/(H/C)$$

where
G is a variable gain factor to be discussed below;
$T_{sp}$ is the set point temperature;
T is the instantaneous current temperature of the space;
A/C and H/C are the space flow constants and energy input constants described above; and
Q is the heat flow density measured by the heat flow sensor 12.

It will be noted that the above "on" time equation will produce an "on" time signal in response to a heat flow imbalance even if there is no deviation between the set point temperature and the instantaneous temperature of the space. In practical terms, this means that the perimeter heating and cooling system is commanded to supply thermal energy into the space and compensate for the heat loss or heat gain through the building envelope before those losses or gains produce any appreciable change in the temperature of the space. The temperature of the space is thus controlled in a highly accurate and optimal manner.

The variable gain factor G is a correction factor for non-ideal systems which is based on the difference between the set point temperature $T_{sp}$ and the instantaneous space temperature T as measured by the temperature sensor 14 and is defined as follows for a heating cycle:

$$G = (T - T_{sp} - B)/(T_{sp} - T - B)$$

where
B is a fixed constant which is selected to vary the rate of change of the gain as a function of temperature deviation in a manner which is optimal for the particular system under consideration.

(NB. For a cooling cycle the variable gain factor is defined as the inverse of G or 1/G).

Referring to FIG. 12, the gain G represented by the slopes of the various power demand curves 162-164 is unity (162) when the space temperature T equals the set point temperature $T_{sp}$. It increases (164) when the temperature T drops below the set point temperature $T_{sp}$ and decreases (163) when it rises above the set point temperature $T_{sp}$. In other words, the gain of the heat flow based perimeter heating and cooling control system, and consequently the amount of thermal energy which is introduced into the space, varies in direct relation to the temperature deviation, producing higher gain and more thermal output power when the deviation is high and lower gain and less thermal output power when the deviation is low. This automatic compensation and self-correction feature results in improved temperature control performance, more accurate temperature maintenance and significant energy savings.

For heat pump based systems, which cannot be cycled at the relatively fast sampling rate used for the "on" time determination, the "on" time signal applied to the subsequent output control operation 164 is overriden by a protection delay of at least five minutes from the last "on" time. This prevents the heat pump compressor from restarting within five minutes of the last compressor operation or power loss. However, the "on" time determination is continued during the delay period and is fully implemented after completion of the delay.

The results of the "on" time control operation 156, together with the temperature measurements taken by the temperature sensor 14 and the various user selected heat and cool set point temperatures entered via the keyboard 76, are used as input data for the output control operation 164. The output control operation 164 executes various logic functions to produce the previously described relay, pulse and output signals at the respective control unit output terminals R1–R4, TR and AO which are connected to regulate the operation of the various perimeter heating and cooling devices as described with reference to FIGS. 5–9. The logic functions implement the heat flow working band concept discussed above and provide automatic switching between heating and cooling to regulate the temperature of the space and maintain the desired set point temperatures in an optimal, efficient and accurate manner.

The logic functions and the preferred heat flow working bands used to regulate the various different types of perimeter heating and cooling systems shown in FIGS. 1–3 will now be described.

For ease of presentation, the following definitions and logic conditions have been established:

DEFINITIONS

RT = instantaneous space temperatures as measured by the temperature sensor 14
  SPC = set point temperature for cooling mode
  SPH = set point temperature for heating mode
  RV = operational state of the reversing valve
  OTC = "on" time for cooling as determined by the "on" time control operation 156
  OTH = "on" time for heating as determined by the "on" time control operation 156
  CT = five minute timer for compressor protection delay
  FT = one minute fan timer
  R1 = relay output signal at terminal R1
  R2 = relay output signal at terminal R2
  R3 = relay output signal at terminal R3
  R4 = relay output signal at terminal R4
  TR = pulse output signal at terminal TR
  AO = analog output signal at terminal OA
  MODULATION = the duty cycle output based on the modulation equation described above.

LOGIC CONDITIONS

A = RT ≧ SPC plus 2 degrees
B = OTC > 10 minutes
C = RT ≦ SPC minus 1 degree
D = CT > 5 minutes
E = OTC ≦ 0 minutes
F = RT ≧ SPC plus 3 degrees
G = COOL MODE enabled
H = FT ≧ 1 minute
K = RT ≧ SPC plus 1 degree
L = RT ≦ SPH minus 2 degrees
M = OTH > 10 minutes
N = RT ≧ SPH plus 1 degree
P = RT ≦ SPH minus 3 degrees
R = HEAT MODE enabled
S = OTH ≦ 0 minutes
T = RT ≦ SPH minus 4 degrees
U = EMERGENCY HEAT enabled
W = RT ≦ SPC plus 0.25 degrees
X = RT ≧ SPC minus 0.25 degrees
Y = OTC > 0
SPC ≧ SPH plus 4 degrees The logic equations for a heat pump based perimeter heating and cooling systems of the type shown in FIG. 1 are as follows (NB. In these and all subsequent logic equations presented herein, the symbol "+" represents a logical OR, the symbol "*" represents a logical AND, and the symbol "/" represents a logical NOT):

| HEAT PUMP OUTPUT LOGIC EQUATIONS |
| --- |
| R1 set = R2 set + TR set FAN ON |
| R1 reset = H FAN OFF |
| R2 set = ((A + B) * G * D * R4) + COOL 1 ON |
| ((L + M) * R * D */R4) HEAT 1 ON |
| R2 reset = (C + (E * /A) + /G) + COOL 1 OFF |
| (N + (S * /L) + /R) HEAT 1 OFF |
| R3 set = ((F + (B * A)) * R2) + COOL 2 ON |
| ((P + (M * L)) * R2 HEAT 2 ON |
| R3 reset = R2 reset COOL 2 OFF |
| or HEAT 2 OFF |
| R4 set = /C (Cool activated RV) RV ON |
| R4 reset = /N (Cool activated RV) RV OFF |
| R4 set = /N (Heat activated RV) RV ON |
| R4 reset = /C (Heat activated RV) RV OFF |
| TR set = (T + (M * P)) * R3 HEAT 3 ON |
| TR reset = R2 reset HEAT 3 OFF |
| AO = (MODULATION * /N) + L HEAT 1 ON/OFF |
| - -EMERGENCY HEAT MODE- - |
| TR = U * ((MODULATION * /N) + L) HEAT 1 ON/OFF |
| or |
| AO = (MODULATION * /N) + L) HEAT 1 ON/OFF |

From the foregoing equations, it will be appreciated that the heat pump based perimeter heating and cooling system in the normal mode of operation is provided with two stages of cooling (COOL 1 and COOL 2) and three stages of heating (HEAT 1, HEAT 2 AND HEAT 3). the first two stages of heating and cooling are provided by compressor low-speed and compressor high-speed respectively as regulated by the relays R2, R3 and R4 and the third stage of heating is auxiliary heating provided by the electric heating coils operating at full power under control of the pulse output TR. In the emergency mode of operation, first stage heating is provided by the electric or hot water heating coil operating under variable power control regulated by the pulse output TR or the analog output AO. In either mode, the run time and the stage of heating or cooling is determined by the temperature deviation from set point as measured by the temperature sensor 14 and the accumulated amount of heat flow through the building envelope as measured by the heat flow sensor 12 and reflected in the results of the "on" time control operation 156. In the normal mode of operation, a two degree temperature deviation initiates first stage heating or cooling and a three degree temperature deviation initiates second stage heating or cooling. Third stage heating is initiated when the space temperature is four degrees or more below set point.

An "on" time determination of ten minutes or more initiates first stage heating or cooling when the temperature deviation is less than two degrees, initiates second stage heating or cooling when the temperature deviation is between two degrees and three degrees, and initiates third stage heating when the temperature deviation is three degrees or more. The heat flow working band also extends one degree above (for heating) or one degree below (for cooling) set point, a ten minute "on" time determination initiating heating or cooling while in that range to account for rapid changes in heat flow.

In the emergency mode of operation, first stage heating is provided by the electric or hot water heating coil operating at full power when the space temperature is two degrees or more below set point. Between two degrees below set point and one degree above set point, the "on" time determination modulates the heating coil to produce a level of thermal output power which is proportional to the temperature deviation and heat flow condition.

A five minute lockout is provided after heat pump shut down to prevent unwanted compressor cycling. A one minute fan timer allows the fan to remain "on" for a brief time after completion of heating or cooling to provide thorough air circulation. A heat/cool interlock is provided in the form of "enabling" functions so that heating can not turn "on" when the space conditions demand cooling, and visa versa.

The logic equations for conventional perimeter heating and cooling systems of the types shown in FIGS. 2 and 3 are as follows:

| CONVENTIONAL OUTPUT LOGIC EQUATIONS |
| --- |
| R1 set = R2 set + R4 set + TR set FAN ON |
| R1 reset = R3 set * H FAN OFF |
| R2 set = ((K + (/E * /W)) * G COOL 1 OPEN |
| R2 reset = ((W + (E * /K)) + /G COOL 1 STOP |
| R3 set = ((C + (E * /X)) + /G COOL 1 CLOSE |
| R3 reset = (X + (/E * /C)) * G COOL 1 STOP |
| - - HEAT = R4; HEAT 2 = TR - - |
| (OPTION 1) |
| R4 set = (L + M) * R HEAT 1 ON |
| R4 reset = N + (S * /L) + /R HEAT 1 OFF |
| TR set = ((P + (M * L)) * R4 HEAT 2 ON |
| TR reset = R4 reset HEAT 2 OFF |
| - - HEAT 1 = TR; R4 = not used - - |
| (OPTION 2) |
| TR = (MODULATION * /N) + L HEAT 1 ON/OFF |
| - - COOL 1 = AO; HEAT 1 = TR; R1-R4 = not used - - |
| (OPTION 3) |
| AO = (MODULATION */C) + A COOL 1 ON/OFF |
| TR = (MODULATION */N) + L HEAT 1 ON/OFF |
| - - HEAT 1 = AO - - |
| (OPTION 4) |
| AO = (MODULATION */N) + L HEAT 1 |

From the foregoing equations (OPTION 1), it will be appreciated that a conventional heating and cooling system using a fan powered unit with reheat (FIG. 3) is provided with one stage of cooling (COOL 1) and two stages of heating (HEAT 1 AND HEAT 2). The cooling is provided by an electric motor-controlled damper whose opening, closing and stopping is regulated by the relays R2 and R3. The first stage of heating is provided by a plenum fan with an external switch regulated by the relay R4 while the second stage of heating is provided by an electric duct heater operating at full power under control of the pulse output TR.

A conventional perimeter system using a VAV unit and baseboard heater (FIG. 2), or a system using a fan powered unit with an end switch-activated plenum fan, is provided with one stage of cooling (COOL 1) and one stage of heating (HEAT 1). The cooling is provided by an electric motor-operated damper regulated by the relays R2 and R3 (OPTION 2 and OPTION 4) or by a pneumatic motor-operated damper regulated by the analog output AO (OPTION 3). In the latter case, the heating is provided by an electric baseboard heater operating under variable power control regulated by the pulse output TR, while in the former case, the heating is provided by an electric baseboard heater operating under variable power control regulated by the pulse output TR (OPTION 2) or by a hot water baseboard heater operating under variable power control regulated by the analog output AO (OPTION 4).

As was the case with the heat pump based system, the conventional system regulates the run time and stage of heating or cooling in accordance with the temperature deviation from set point as measured by the temperature sensor 14 and the accumulated amount of heat flow through the building envelope as measured by the heat flow sensor 12 and reflected in the results of the "on" time control operation 156

In the OPTION 1 mode, the amount of cooling as determined by the opening and closing of the damper is governed by the "on" time determination unless the space temperature is one degree or more from set point, at which time the temperature sensor will control. First stage heating is initiated when the space temperature is two degrees or more below set point or when the space temperature is between two degrees below and one degree above set point and the "on" time determination is ten minutes or more. Second stage heating is initiated when the space temperature is three degrees or more below set point or when the space temperature is between two degrees and three degrees below set point and the "on" time determination is ten minutes or more.

In the OPTION 2 through OPTION 4 modes, heating is provided by the heating coil operating at full power when the space temperature is two degrees more below set point. Between two degrees below and one degree above set point, the "on" time determination modulates the heating coil to produce a level of thermal output power which is proportional to the temperature deviation and heat flow condition. Cooling in the OPTION 2 and OPTION 4 modes is provided in the manner described in the preceeding paragraph. In the OPTION 3 mode, cooling is provided by operating the damper motor at full power when the space temperature is two degrees or more above set point. Between two degrees above and one degree below set point, the "on" time determination modulates the damper motor to operate at a power which is proportional to the temperature deviation and the heat flow condition.

All of the conventional systems are provided with a dead band which prevents premature initiation of the heating stage. In systems using a VAV unit and baseboard heater, the dead band prevents activation of the baseboard heater until the damper has reached its minimum or fully closed position. In systems using the fan powered with an end switch, the end switch automatically activates the plenum fan upon closure of the damper to provide a preliminary heating stage. The dead band prevents the main heating stage (HEAT 1) from being initiated before the plenum fan has had an opportunity to sufficiently heat the space. A one minute fan timer allows the fan to remain "on" for a brief time after completion of heating or cooling to provide thorough air circulation.

Following the output control operation 164, the processor 68 is commanded to return to the start operation 166 where it repeats the cycle of instructions stored in the memory 70. In this manner, the control unit output signals, and consequently the operation of the perimeter heating and cooling system, is continually adjusted and updated in real time to take account of the current and changing thermal conditions of the space.

From the foregoing, it will be appreciated that the present invention provides a perimeter thermal energy control system which has effective control for heat pumps and air conditioning units, which establishes a learning capability whereby the system automatically self-adapts to the thermal characteristics of the space, and which optimizes the control function for improved performance in both the normal and morning recovery modes of operation.

While a particular form of the invention has been illustrated and described it will be apparent that various modifications can be made without departing from the spirit and scope of the invention.

We claim:

1. A method for regulating a building thermal energy control system comprising:
   storing in a data memory a predetermined set point temperature for a building space;
   measuring the temperature of the space by use of a temperature sensor which is reactive to the instantaneous temperature of the space to generate instantaneous temperature signals proportional thereto; entering said instantaneous temperature signals into the data memory;
   comparing said set point temperatures with said instantaneous temperature signals in the data processor to produce temperature deviation signals;
   measuring over an extended period of time the magnitude and direction of heat flow through an envelope surrounding said building space, said envelope being exposed to outside weather conditions and said measurements being made by a heat flow sensor which is reactive to the instantaneous magnitude and direction of heat flow through said envelope to generate instantaneous heat flow signals proportional thereto;
   storing said instantaneous heat flow signals in the data memory over said extended period of time;
   summing said instantaneous heat flow signals in a data processor to produce control signals having magnitudes and signs representative of the net magnitudes and directions of said summations of said instantaneous heat flow signals;
   producing output signals form the data processor in response to the magnitudes and signs of said control signals;
   varying the gain of said output signals in accordance with said temperature deviation signals so that said gain increases and decreases in proportion to increases and decreases in the magnitudes of said temperature deviation signals;
   applying the output signals to interface means which operates a thermal energy control system adapted to introduce thermal energy into the building space; and
   regulating the operation of said thermal energy control system in response to the gain of said output signals to introduce thermal energy at a higher rate when the temperature deviation signals are relatively large and at a lower rate when the temperature deviation signals are relatively small.

2. The method of claim 1 further comprising determining the inherent thermal parameters of the space and the inherent thermal capacity of the thermal energy control system in response to said summations of said instantaneous heat flow signals, and adjusting said output signals to automatically take account of said determined thermal parameters and determined thermal capacity.

3. The method of claim 1 further comprising determining time signals having a magnitude related to said gain and representative of the length of time needed for said thermal energy control system to compensate for said heat flow through said envelope, modulating said output signals to produce pulse signals modulated in accordance with said time signals, operating said interface means to supply variable amounts of power to said thermal energy control system in response to said modulated pulse signals whereby said varying of the gain produces variations in the amount of power supplied to said thermal energy control system.

4. The method of claim 1 wherein said summing of said instantaneous heat flow signals comprises integrating said instantaneous heat flow signals.

5. The method of claim 1 further comprising determining time signals in response to said control signals said time signals being representative of the length of time needed for said thermal energy control system to compensate for said heat flow through said envelope.

6. The method of claim 5 wherein said output signals comprise pulse signals modulated in accordance with said time signals, said interface means comprising variable power means for supplying variable amounts of power to said thermal energy control system in response to said modulated pulse signals.

7. The method of claim 1 further comprising delaying said application of said output signals to said interface means for a predetermined delay time interval, and summing said instantaneous heat flow signals in the data processor over said delay time interval to produce delay time control signals having magnitudes and signs representative of the net magnitudes and directions of said summations of said instantaneous heat flow signals over said delay time interval, said output signals produced from said data processor being responsive to the magnitudes and signs of said delay time control signals.

8. The method of claim 7 wherein the building thermal energy control system comprises compressor means.

9. The method of claim 8 wherein the compressor means comprises a heat pump.

10. The method of claim 2 wherein said thermal parameters and said thermal capacity are determined in the form of numerical constants which are used by the processor to produce said output signals.

11. The method of claim 10 wherein said thermal parameters are determined in the form of space flow constants and said thermal capacity is determined in the form of energy input constants.

12. The method of claim 10 wherein said determination of the inherent thermal parameters of the space is made during a sustained period of decrease in the temperature of the space with little or no thermal energy being introduced into the space by said thermal energy control system, and said determination of the inherent thermal capacity of the thermal energy control system is made during a sustained period of increase in the temperature of the space with sustained introduction of thermal energy into the space by the thermal energy control system.

13. The method of claim 10 wherein said determinations of the inherent thermal parameters and inherent thermal capacity are made periodically at spaced time intervals, the previously determined values being updated at each subsequent determination by use of a moving average.

14. Method for regulating a building thermal energy control system comprising:

measuring over an extended period of time the magnitude and direction of heat flow through an envelope surrounding a building space, said envelope being exposed to outside weather conditions and said measurement being made by a heat flow sensor which is reactive to the instantaneous magnitude and direction of heat flow through said envelope to generate instantaneous heat flow signals proportional thereto;

storing said instantaneous heat flow signals in a data memory over said extended period of time, summing said instantaneous heat flow signals in a data processor to produce control signals having magnitudes and signals representative of the net magnitudes and directions of said summations of said instantaneous heat flow signals;

producing output signals from said data processor in response to the magnitudes and signs of said control signals;

determining the inherent thermal parameters of the space and the inherent thermal capacity of the thermal energy control system provided to introduce thermal energy into the space, in response to said summations of said instantaneous heat flow signals, and adjusting said output signals to automatically take account of said determined thermal parameters and determined thermal capacity, said determination of the inherent thermal parameters of the space being made during a sustained period of decrease in the temperature of the space with little or no thermal energy being introduced into the space by said thermal energy control system, and said determination of the inherent thermal capacity of the thermal energy control system being made during a sustained period of increase in the temperature of the space with sustained introduction of thermal energy into the space by the thermal energy control system;

measuring the temperature of the space by use of a temperature sensor which is reactive to the instantaneous temperature of the space to generate first and second instantaneous temperature signals proportional to the instantaneous temperature of the space at the beginnings and ends of said sustained periods, respectively, storing said first and second instantaneous temperature signals in said data memory;

comparing aid first and second instantaneous temperature signals in the data processor to produce temperature different signals, the determining of said inherent thermal parameters and inherent thermal capacity also being in response to said temperature difference signals;

applying the output signals to interface means which operates the thermal energy control system; and regulating the operation of said thermal energy control system in response to said output signals.

* * * * *

UNITED STATES PATENT AND TRADEMARK OFFICE
CERTIFICATE OF CORRECTION

PATENT NO. : 4,784,212

DATED : November 15, 1988

INVENTOR(S) : Benny Brimer, William A. Hays, Jr, Dieter L. Rall

It is certified that error appears in the above-identified patent and that said Letters Patent is hereby corrected as shown below:

Column 1, line 39, delete "Other" and insert --Others--;
   Column 1, line 51, after "impact" delete ",";
   Column 6, line 58, delete "o" and insert --on--;
   Column 7, line 14,
delete "s" and insert --is--;
   Column 7, line 62, delete "e.o." and insert --e.g.--;
   Column 11, line 1, delete "river" and insert --driver--;
   Column 12, line 13, delete "compute(and symbol)" and
insert --computes--;
   Column 14, line 36, delete "hear" and insert --heat--;
   Column 21, line 45, delete "form" and insert --from--;
   Column 23, line 18, delete "signals" and insert --signs--;
   Column 24, line 21, delete "aid" and insert --said--; and
   Column 24, line 23, delete "different" and insert
--difference.

Signed and Sealed this

Ninth Day of May, 1989

Attest:

DONALD J. QUIGG

*Attesting Officer*   *Commissioner of Patents and Trademarks*